(12) United States Patent
Hanna et al.

(10) Patent No.: US 10,075,282 B2
(45) Date of Patent: Sep. 11, 2018

(54) MANAGING BURST TRANSMIT TIMES FOR A BUFFERED DATA STREAM OVER BONDED UPSTREAM CHANNELS

(71) Applicant: STMicroelectronics, Inc., Coppell, TX (US)

(72) Inventors: Charaf Hanna, Lewisville, TX (US); Benjamin Nelson Darby, Huntsville, AL (US); Zhifang J Ni, Plano, TX (US); John Wrobbel, Carrollton, TX (US)

(73) Assignee: STMicroelectronics, Inc., Coppell, TX (US)

( * ) Notice: Subject to any disclaimer, the term of this patent is extended or adjusted under 35 U.S.C. 154(b) by 157 days.

(21) Appl. No.: 15/049,296

(22) Filed: Feb. 22, 2016

(65) Prior Publication Data

US 2017/0244539 A1    Aug. 24, 2017

(51) Int. Cl.
*H04L 7/00* (2006.01)

(52) U.S. Cl.
CPC .................. *H04L 7/0008* (2013.01)

(58) Field of Classification Search
CPC .................................................. H04L 7/0008
See application file for complete search history.

(56) References Cited

U.S. PATENT DOCUMENTS

| 8,213,452 | B2 | 7/2012 | Hou | |
|---|---|---|---|---|
| 8,705,567 | B2 | 4/2014 | Denney et al. | |
| 8,711,878 | B2 | 4/2014 | Denney et al. | |
| 2015/0071302 | A1* | 3/2015 | Hanna | H04L 47/6215 370/429 |
| 2016/0255129 | A1* | 9/2016 | Walker | H04L 43/0852 709/219 |

* cited by examiner

*Primary Examiner* — Feben Haile
(74) *Attorney, Agent, or Firm* — Crowe & Dunlevy (57) ABSTRACT

Upstream burst transmit times are dynamically communicated to the transmit unit in grants issued over time and in any order. A critical parameter is when to trigger the operation to order the buffered data stream for transmission. If the ordering operation is triggered too soon, a later grant of an earlier burst transmit time may not be accounted for and the subsequent transmission could violate the transmission order rule. If the ordering operation is triggered too late, the decision to transmit a burst at an earlier burst transmit time may violate the margin rule. To address these concerns, a fetch offset time in advance of each granted burst transmit time is assigned. As each fetch offset time is sequentially reached, a next partial data portion of the buffered data stream is prepared for burst communication.

12 Claims, 5 Drawing Sheets

MANAGING BURST TRANSMIT TIMES FOR A BUFFERED DATA STREAM OVER BONDED UPSTREAM CHANNELS

TECHNICAL FIELD

The present invention relates to the allocation of a buffered data stream to granted bursts on bonded upstream channels.

BACKGROUND

Figure 5:
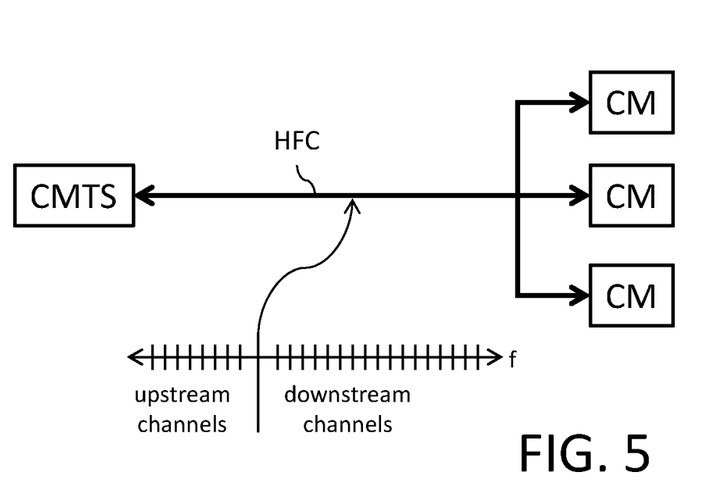
FIG. 5 illustrates a cable infrastructure.

The Data Over Cable Service Interface Specification (DOCSIS) provides a specification for governing communications over a cable infrastructure (FIG. 5) between an end user device (referred to as a cable modem (CM)) and a central controller (referred to as a cable modem termination system (CMTS)). The cable infrastructure may comprise a hybrid fiber coax (HFC) link which supports a plurality of radio frequency (RF) channels that are divided into downstream channels and upstream channels. There are typically many more downstream channels than upstream channels (for example, groups of 32 single carrier QAM downstream channels and 8 single carrier QAM upstream channels). Generally when a cable modem desires to make an upstream transmission, the cable modem must first make a request to the central controller to use the HFC link because the upstream channels are a shared resource among the connected cable modems. The request states the amount of data the requesting cable modem wants to send. In scheduling the upstream transmissions, the central controller will consider the requests received from all connected cable modems. For each upstream channel, the central controller sends a grant message (referred to as a MAP message in DOCSIS) in the downstream direction. The grant message conveys information as to how a particular upstream RF channel is to be used over a defined interval of time. In particular, the grant message specifically identifies, for the upstream RF channel, when and for how long each cable modem is permitted to use the RF channel to make a burst upstream communication.

Each cable modem that receives the grant message will process the grant message in order to identify the specific transmission grants that have been allocated by the central controller for use by the cable modem. When the time for transmission arrives, the cable modem accesses the allocated one of the upstream RF channels and makes the transmit burst communication.

The cable modem may support a plurality of subscriber services. Examples of such services include: telephony, video, pay-per-view, internet, audio, file transfer, etc. This list of services is not intended to be exhaustive. In support of these services, the cable modem is assigned corresponding service identifier (SID) codes that are used by the central controller to allocate bandwidth (both on the upstream and downstream). In the upstream, multiple SIDs, also referred to as an SID cluster, are used to identify a specific data flow, one SID per upstream channel used by that data flow.

The plurality of downstream RF channels support the downstream data flows from the central controller to the plurality of connected cable modems. The plurality of upstream RF channels support the upstream data flows from the plurality of connected cable modems to the central controller. It is accordingly understood that there is contention for use of the upstream RF channels. Each upstream RF channel carries bursts of packets from the cable modems. The contention is avoided by the central controller with each upstream channel being broken into a plurality of assignable time (and code or frequency) slots (referred to as minislots), and each cable modem makes its upstream burst signal transmission only during the time (and code or frequency) slot(s) assigned to it by the central controller in the grant message.

DOCSIS further supports bonding together of multiple upstream RF channels in a bonded upstream channel group in order to increase upstream throughput. For example, a bonded upstream channel group could be assigned to a particular cable modem in support of one of its services. When a cable modem makes a request for upstream bandwidth for a given service, the central controller can choose whether to grant that request on a single upstream RF channel or on several upstream RF channels of the bonded upstream channel group. In response to receipt of grants for use of the bonded upstream channel group, the cable modem must divide the data stream into bursts that fit within the instructions for those grants and then access the individual RF channels within the bonded upstream channel group to transmit the bursts at the specified time (and code or frequency) using the allocated minislots. Some or all of the burst communications may be simultaneous or partially overlapping on the plural channels of the bonded upstream channel group.

Figure 1:
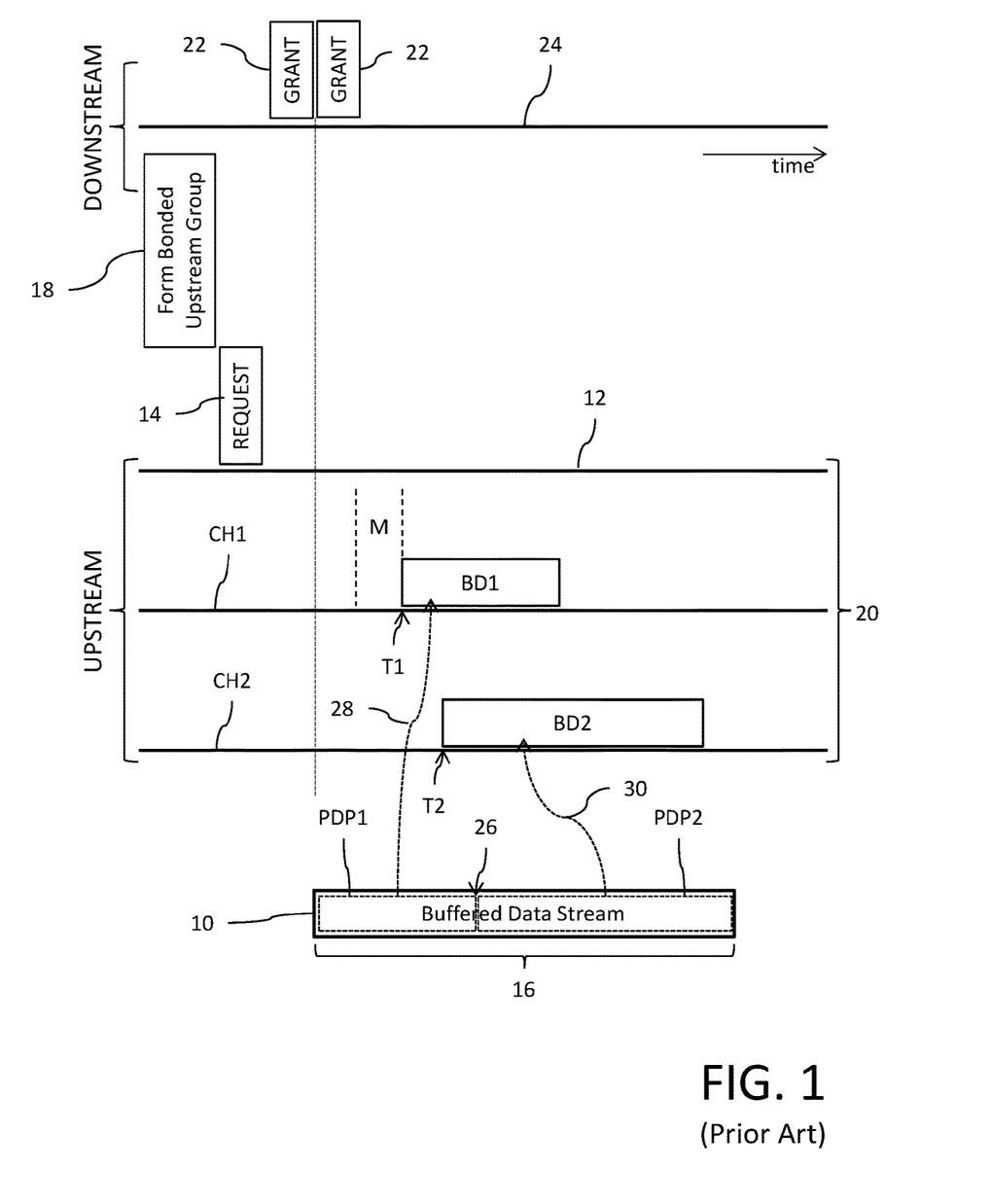
FIGS. 1-4 show communication diagrams for scheduling and implementing burst communications.

Reference is made to FIG. 1 showing an example of this process. Assume that the cable modem has a buffered data stream 10 relating to a given SID cluster. On an upstream RF channel 12, the cable modem makes a request 14 for bandwidth. This request 14 will include information concerning the size 16 of the buffered data stream 10 as well as an SID that corresponds to the upstream RF channel 12, that SID being a member of the SID cluster identifying data stream 10. The central controller receives and processes the request. Prior to this point in time, the central controller has already decided 18 to bond together multiple upstream RF channels in a bonded upstream channel group 20 to support upstream communications by assigning the SID cluster for the data stream 10. The central controller further issues grant messages 22 on a downstream channel 24 providing information to the cable modem regarding accessing the upstream channels within the bonded upstream channel group 20 to transmit the buffered data stream 10. The information conveyed by the grant messages 22 includes information indicative of: a starting time T1 of each allocated burst communication interval, a burst duration BDj (i.e., number of minislots allocated) and the upstream channel CHk to be used. In this example, the grant messages 22 grant the cable modem access to channel CH1 at time T1 for burst duration BD1 and access to channel CH2 at time T2 for burst duration BD2. The cable modem responds to the grant messages 22 by dividing 26 the buffered data stream 10 into a first partial data portion PDP1 (containing bytes which can be transmitted within the burst duration BD1) and a second partial data portion PDP2 (containing bytes which can be transmitted within the burst duration BD2). When the time T1 arrives, the cable modem accesses channel CH1 and transmits the first partial data portion PDP1 of the buffered data stream 10 (reference 28). When the time T2 arrives, the cable modem accesses channel CH2 and transmits the second partial data portion PDP2 of the buffered data stream 10 (reference 30).

It will be noted that the cable modem, in transmitting the upstream bursts for carrying partial data portions which belong to the same buffered data stream 10 over the upstream channels of the bonded upstream channel group 20, could experience a significant skew across the upstream channels. This skew can be exacerbated by the physical characteristics differences among the upstream channels. For example, the two channels may use different modulation parameters, different formatting, different forward error correction, etc.

There are two main rules which govern the transmission function by the cable modem:

1. Transmission order rule. In order to reduce the skew, the time ordering of assigning partial data portions to the grant allocated burst communication intervals is controlled so that a burst communication interval having a relatively earlier transmit starting time should be assigned to carry relatively earlier partial data portion(s) of the buffered data stream 10, while a burst communication interval having a relatively later transmit starting time should be assigned to carry relatively later partial data portion(s) of the buffered data stream 10. The operation shown in FIG. 1 effectuates the requirements of the transmission order rule because the cable modem, in response to the grants 22, assigned the relatively earlier first partial data portion PDP1 to the relatively earlier starting time T1 with burst duration BD1. The relatively later second partial data portion PDP2 is assigned to the relatively later starting time T2 with burst duration BD2.

2. Margin rule. There is a minimum time interval, referred to as the margin M, that is required from the instant in time that the cable modem decides to transmit a burst to the starting time T1 when that burst occurs. The grant messages 22 must be received and processed by the cable modem with sufficient advance timing so that the margin rule is not violated. The operation shown in FIG. 1 satisfies the margin rule because the time of the grant messages 22 is sufficiently early enough to permit processing prior to a time T1-M.

Figure 2:
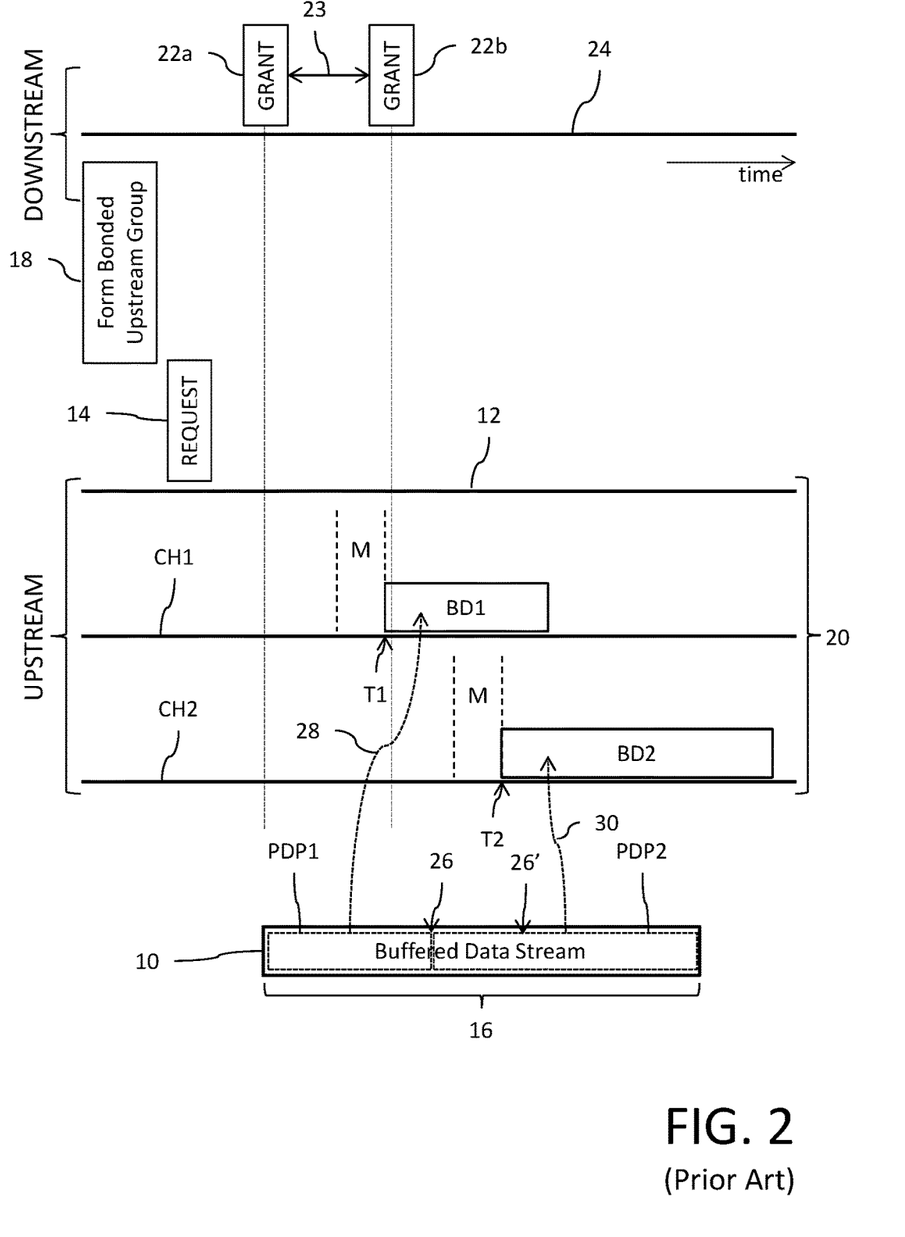

Reference is now made to FIG. 2. The process may be complicated by situations where the central controller responds to the cable modem's request 14 for bandwidth by issuing two (or more) grant messages 22a and 22b separated by a substantive time interval 23. This may occur, for example, because the central controller is unable at the time of the first grant message 22a to issue the necessary grant messages to allocate sufficient bandwidth to handle the size 16 of the buffered data stream 10. At a later point in time, when bandwidth to handle any remaining portion of the buffered data stream 10 becomes available, the central controller issues the second grant message 22b.

Assume again that the cable modem has a buffered data stream 10 relating to a given SID cluster. On an upstream RF channel 12, the cable modem makes a request 14 for bandwidth. This request 14 will include information concerning the size 16 of the buffered data stream 10 as well as the SID. The central controller receives and processes the request. Again, prior to this point in time, the central controller had decided 18 to bond together multiple upstream RF channels in a bonded upstream channel group 20 to support upstream communications by assigning the SID cluster for that data stream 10. The central controller next issues a first grant message 22a on a downstream channel 24 providing information to the cable modem regarding accessing the channels within the bonded upstream channel group 20 to transmit the buffered data stream 10. In this example, the first grant message 22a grants the cable modem access to channel CH1 at time T1 for burst duration BD1. The cable modem responds to the first grant message 22a by dividing 26 the buffered data stream 10 to provide a first partial data portion PDP1 (containing bytes which can be transmitted within the burst duration BD1). When time T1 arrives, the cable modem accesses channel CH1 and transmits the first partial data portion PDP1 of the buffered data stream 10 (reference 28). Around (either before or after) the starting time T1, the central controller, recognizing that the bandwidth allocated in the first grant message 22a was insufficient, issues a second grant message 22b on the downstream channel 24 providing information to the cable modem regarding accessing the channels within the bonded upstream channel group 20 to further transmit the buffered data stream 10. In this example, the second grant message 22b grants the cable modem access to channel CH2 at time T2 for burst duration BD2. The cable modem responds to the second grant message 22b by identifying 26' a second partial data portion PDP2 of the divided buffered data stream 10 (containing bytes which can be transmitted within the burst duration BD2). When time T2 arrives, the cable modem accesses channel CH2 and transmits the second partial data portion PDP2 of the buffered data stream 10 (reference 30).

Assume now that the first grant message 22a grants the cable modem access to channel CH1 at time T1 for burst duration BD1, and that the second grant message 22b grants the cable modem access to channel CH2 at time T2 for burst duration BD2, but that starting time T2 is earlier in time than starting time T1. This is opposite from the case in FIG. 2 described above, thus the later in time grant message has allocated an earlier in time starting time. It would not be appropriate for the cable modem to transmit the relatively later partial data portion PDP2 in this relatively earlier starting time T2. This would violate the transmission order rule.

Figure 3:
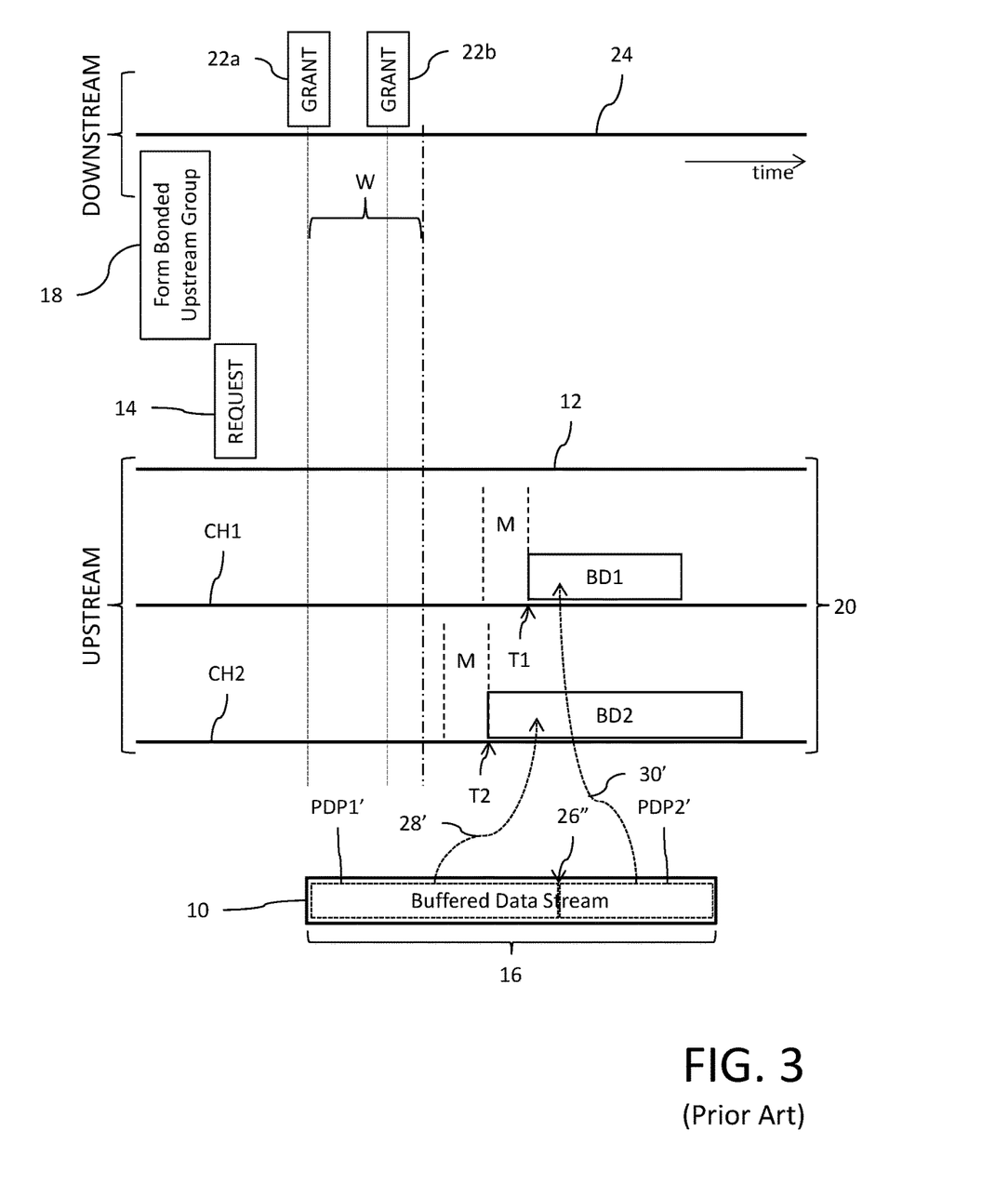

Reference is now made to FIG. 3. To address the foregoing problem, the cable modem is configured to respond to the first grant message 22a by opening a delay window W. During this delay window W, the cable modem waits to see if the central controller will issue any more grant messages on the downstream channel relating to use of the bonded upstream channel group 20. The delay window W is set to expire sufficiently far in advance of the starting time T1 specified by the first grant message 22a in order to ensure that the margin rule is not violated. If the second grant message 22b is received within the delay W, it will be processed by the cable modem along with the first grant message 22a for purposes of planning the burst communications. Such is the case in FIG. 3. The cable modem responds to the first and second grant messages 22a and 22b by dividing 26" the buffered data stream 10 into a first partial data portion PDP1' (containing bytes which can be transmitted within the burst duration BD2 which will occur earlier at time T2) and a second partial data portion PDP2' (containing bytes which can be transmitted within the burst duration BD1 which will occur later at time T1). When time T2 arrives (reminder: T2 is before T1), the cable modem accesses channel CH2 and transmits the first partial data portion PDP1' of the buffered data stream 10 (reference 28'). When time T1 arrives, the cable modem accesses channel CH1 and transmits the second partial data portion PDP2' of the buffered data stream 10 (reference 30'). This technique ensures that the transmission order rule is not violated.

The delay window solution described above does not present a satisfactory solution. If the delay window is too small, then the second grant message 22b will not be handled along with the first grant message 22a. This could result in a violation of the transmission order rule. If the delay window is instead too large, the messages 22a and 22b will be handled together, but there is a risk that the margin rule will be violated.

There is accordingly a need in the art for a better way to handle multiple grant messages.

SUMMARY

In an embodiment, a method comprises: receiving a plurality of grant messages, each grant message providing burst communication information indicative of a transmit time, a burst duration and a channel of a bonded channel group including a plurality of channels to be used for making a burst communication of a portion of a buffered data stream; determining an action time for each burst communication that is equal to the transmit time minus a fetch interval; monitoring a current time in comparison to the action times; when the current time equals one of the action times, preparing a portion of the buffered data stream for communication; monitoring the current time in comparison with the transmit times; and when the current time equals one of the transmit times, transmitting the prepared portion of the buffered data stream as the burst communication on the channel of the bonded channel group and for the burst duration that are specified in the burst communication information of the received grant message with the corresponding transmit time.

In an embodiment, a method comprises: receiving a plurality of grant messages, each grant message providing burst communication information indicative of a transmit time, a burst duration and a channel of a bonded channel group including a plurality of channels to be used for making a burst communication of a portion of a buffered data stream; determining an action time for each burst communication that corresponds to the transmit time minus a fetch interval; monitoring a current time in comparison to the action times; when the current time equals an earlier one of the action times, preparing an earlier portion of the buffered data stream for communication and then transmitting the prepared earlier portion of the buffered data stream on the channel of the bonded channel group specified in the grant message with the corresponding transmit time when the current time equals the corresponding transmit time; and when the current time equals a later one of the action times, preparing a later portion of the buffered data stream for communication and then transmitting the prepared later portion of the buffered data stream on the channel of the bonded channel group specified in the grant message with the corresponding transmit time when the current time equals the corresponding transmit time.

In an embodiment, a method comprises: receiving a first grant message providing first burst communication information indicative of a first transmit time, a first burst duration and a first channel of a bonded channel group including a plurality of channels to be used for making one burst communication of one portion of a buffered data stream; determining a first action time for the first burst communication equal to the first transmit time minus a first fetch interval; receiving a second grant message providing second burst communication information indicative of a second transmit time, a second burst duration and a second channel of a bonded channel group to be used for making another burst communication of another portion of the buffered data stream; determining a second action time for the second burst communication equal to the second transmit time minus a second fetch interval; wherein the second action time is earlier than the first action time; monitoring a current time in comparison to the first and second action times; when the current time equals the earlier second action time, preparing an earlier portion of the buffered data stream for communication; when the current time equals the second transmit time, transmitting the prepared earlier portion of the buffered data stream on the second channel of the bonded channel group specified in the second grant message; when the current time equals the first action time, preparing a later portion of the buffered data stream for communication; and when the current time equals the first transmit time, transmitting the prepared later portion of the buffered data stream on the first channel of the bonded channel group specified in the first grant message.

In an embodiment, a method comprises: receiving a plurality of grant messages, each grant message providing burst communication information indicative of a transmit time, a burst duration and a channel of a bonded channel group including a plurality of channels to be used for making a burst communication of a portion of a buffered data stream; assigning a fetch offset time in advance of each granted transmit time; and as each fetch offset time is reached, preparing a next partial data portion of the buffered data stream for burst transmission at the transmit time and over the channel specified by the received grant message.

BRIEF DESCRIPTION OF THE DRAWINGS

For a better understanding, preferred embodiments thereof are now described, purely by way of non-limiting example, with reference to the attached drawings, wherein.

DETAILED DESCRIPTION

Figure 4:
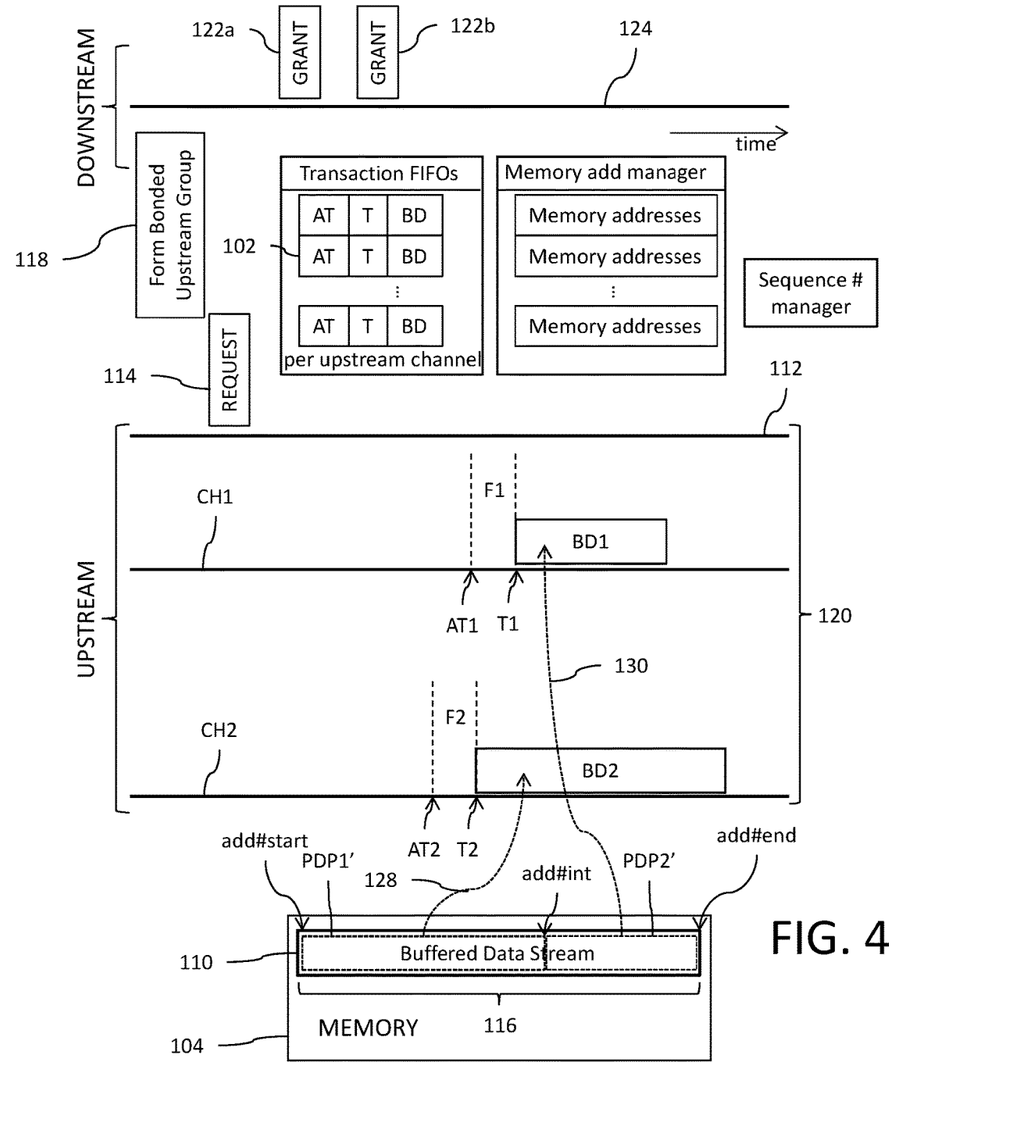

Reference is now made to FIG. 4.

Assume again that the cable modem (or device embedding a cable modem) has a buffered data stream 110 relating to a given SID cluster. The bytes of the buffered data stream 110 may be stored in an addressable memory 104 between a starting address add#start and ending address add#end. An address pointer for that data stream 110 is initialized at the starting address add#start.

On an upstream RF channel 112, the cable modem makes a request 114 for bandwidth. It will be understood that the request 114 may be made over any upstream channel relating to the SID cluster, the designation of channel 112 used for the request being only an example and not a limitation as any of channels CH1, CH2, CHk, etc. could be used. This request 114 will include information concerning the size 116 of the buffered data stream 110 as well as the SID of the upstream channel 112, which is a member of the SID cluster. This SID uniquely identifies the data stream 110. The central controller receives and processes the request. Again, previous to this point in time, the central controller had decided 118 to bond together multiple upstream RF channels in a bonded upstream channel group 120 to support upstream communications for that data stream 110. The central controller may issue one or more grant messages 122 on one or more downstream channels 124 (only one such channel shown as an example without limitation), wherein each grant message includes information indicative of: a starting time T1 of each allocated burst communication interval, a burst duration BDj (i.e., number of minislots) and the upstream channel CHk to be used. The cable modem further stores, for each channel Chk, an associated fetch interval Fk which indicates processing time required to prepare a desired data portion for burst transmission. In a preferred implementation, the fetch interval Fk is based on the transmission characteristics over a given channel. The fetch interval Fk may be set on a per-burst basis, and thus may change over time in accordance with the transmissions being made.

In this context, it will be understood that the margin relates to an overall system interval (including, for example, software and hardware processing times), while the fetch interval relates specifically to the hardware processing time. So, the margin will be greater than the fetch interval.

Let's say that the central controller issues a first grant message 122a providing information to the cable modem regarding accessing the channels within the bonded upstream channel group 120 to transmit the buffered data stream 110. In this example, the first grant message 122a grants the cable modem access to channel CH1 at time T1 for burst duration BD1. With respect to the identified service, the cable modem saves the details of the first grant message 122a in a transaction FIFO 102 on a per upstream channel basis along with an action time AT that is set equal to the grant message specified starting time T1 minus the fetch interval F1 for the allocated channel CH1.

Now, let's further say that the central controller issues a second grant message 122b providing information to the cable modem regarding further accessing the channels within the bonded upstream channel group 120 to transmit the buffered data stream 110. In this example, the second grant message 122b grants the cable modem access to channel CH2 at time T2 for burst duration BD2. The cable modem saves the details of the second grant message 122b in the transaction FIFO 102 on a per upstream channel basis along with an action time AT that is set equal to the grant message specified starting time T2 minus the fetch interval F2 for the allocated channel CH2.

The cable modem then monitors for when a current time matches an action time for every channel. In this example, the earliest action time AT is AT2 relating to the second grant message 122b. When the current time matches action time AT2, the cable modem uses a memory address manager to support the extraction from the memory 104, starting at the current pointer location (in this case add#start) and ending at an intermediate address add#int, of a first partial data portion PDP1' of the buffered data stream 110. The number of bytes of data of the buffered data stream 110 from add#start to add#int is equal to the number of bytes which can be transmitted on channel CH2 within the burst duration BD2. The pointer is incremented to now point to address add#int+1. These extracted bytes are prepared, assigned a sequence number (for example, seq#1) by a sequence number manager and when starting time T2 arrives, the cable modem accesses channel CH2 and transmits the first partial data portion PDP1' of the buffered data stream 110 (reference 128). The sequence number for this transmission is updated along with the beginning address and ending address for the partial data portion.

While the foregoing actions are taking place, the cable modem continues to monitor the current time in comparison to the action times AT. The next action time AT1 relates to the first grant message 112a. When the current time matches action time AT1, the cable modem uses the memory address manager to support the extraction from the memory 104, starting at the current pointer location (in this case add#int+1) and ending at a later address add#end at the end of the buffered data stream 110, of a second partial data portion PDP2' of the buffered data stream 110. The number of bytes of data of the buffered data stream 110 from add#int+1 to add#end is equal to the number of bytes which can be transmitted on channel CH1 within the burst duration BD1. The pointer is incremented to now point to address add#end+1. These extracted bytes are prepared, assigned the next sequence number (for example, seq#2) by the sequence number manager and when starting time T1 arrives, the cable modem accesses channel CH1 and transmits the second partial data portion PDP2' of the buffered data stream 110 (reference 130). The sequence number for this transmission is updated along with the beginning address and ending address for the partial data portion.

It will be understood that the division of the buffered data stream into two partial data portions is by example only. The methods described herein apply to any plurality of partial data portions required to transmit a given buffered data stream.

Each upstream channel 120 is associated with a transaction FIFO 102. The details of each grant message 122 are written into the appropriate transaction FIFO 102 on a per upstream channel basis. Thus, the grant details for time T1 and for burst duration BD1 from a given grant message for a certain channel CHk are stored in the transaction FIFO 102 associated with that channel. The grant details may be accessed from the transaction FIFO 102 in connection with identifying when current time matches the action time AT. At that point in time, the modem will use the memory address manager to read the addressed partial data portion PDP of the buffered data stream from the memory 104 based on the burst duration BD. The sequence number manager assigns a sequence number to the partial data portion PDP. When the current time matches the start time T, the partial data portion PDP is transmitted over the channel.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method, comprising:
    receiving a plurality of grant messages, each grant message providing burst communication information indicative of a transmit time, a burst duration and a channel of a bonded channel group including a plurality of channels to be used for making a burst communication of a portion of a buffered data stream;
    determining an action time for each burst communication that is equal to the transmit time minus a fetch interval;
    monitoring a current time in comparison to the action times;
    when the current time equals one of the action times, preparing a portion of the buffered data stream for communication;
    monitoring the current time in comparison with the transmit times; and
    when the current time equals one of the transmit times, transmitting the prepared portion of the buffered data stream as the burst communication on the channel of the bonded channel group and for the burst duration that are specified in the burst communication information of the received grant message with the corresponding transmit time.

2. The method of claim 1, wherein the channel of the bonded channel group is an upstream channel shared by a plurality of transmit devices.

3. The method of claim 2, wherein the plurality of transmit devices are cable modems or devices containing an embedded cable modem.

4. The method of claim 1, further comprising storing the buffered data stream in an addressable memory between a first memory address and a last memory address;
wherein preparing comprises:
retrieving bytes of data between two addresses in the memory, said retrieved bytes being transmitted within the burst duration; and
assigning those retrieved bytes of data a sequence number.

5. The method of claim 1, further comprising storing the plurality of grant messages with the corresponding action times.

6. The method of claim 1, further comprising:
storing the buffered data stream in an addressable memory between a first memory address and a last memory address; and
incrementing an address pointer to access the memory addresses of the addressable memory and extract said portions of the buffered data stream for transmit.

7. The method of claim 1, further comprising:
assigning to each burst communication a sequence number; and
storing the assigned sequence number.

8. A method, comprising:
receiving a plurality of grant messages, each grant message providing burst communication information indicative of a transmit time, a burst duration and a channel of a bonded channel group including a plurality of channels to be used for making a burst communication of a portion of a buffered data stream;
determining an action time for each burst communication that corresponds to the transmit time minus a fetch interval;
monitoring a current time in comparison to the action times;
when the current time equals an earlier one of the action times, preparing an earlier portion of the buffered data stream for communication and then transmitting the prepared earlier portion of the buffered data stream on the channel of the bonded channel group specified in the grant message with the corresponding transmit time when the current time equals the corresponding transmit time; and
when the current time equals a later one of the action times, preparing a later portion of the buffered data stream for communication and then transmitting the prepared later portion of the buffered data stream on the channel of the bonded channel group specified in the grant message with the corresponding transmit time when the current time equals the corresponding transmit time.

9. The method of claim 8, further comprising storing the plurality of grant messages with the corresponding action times.

10. The method of claim 8, further comprising:
storing the buffered data stream in an addressable memory between a first memory address and a last memory address; and
incrementing an address pointer to access the memory addresses of the addressable memory and extract said portions of the buffered data stream for transmit.

11. The method of claim 8, further comprising:
assigning to each burst communication a sequence number; and
storing the assigned sequence number.

12. A method, comprising:
receiving a first grant message providing first burst communication information indicative of a first transmit time, a first burst duration and a first channel of a bonded channel group including a plurality of channels to be used for making one burst communication of one portion of a buffered data stream;
determining a first action time for the first burst communication equal to the first transmit time minus a first fetch interval;
receiving a second grant message providing second burst communication information indicative of a second transmit time, a second burst duration and a second channel of a bonded channel group to be used for making another burst communication of another portion of the buffered data stream;
determining a second action time for the second burst communication equal to the second transmit time minus a second fetch interval;
wherein the second action time is earlier than the first action time;
monitoring a current time in comparison to the first and second action times;
when the current time equals the earlier second action time, preparing an earlier portion of the buffered data stream for communication;
when the current time equals the second transmit time, transmitting the prepared earlier portion of the buffered data stream on the second channel of the bonded channel group specified in the second grant message;
when the current time equals the first action time, preparing a later portion of the buffered data stream for communication; and
when the current time equals the first transmit time, transmitting the prepared later portion of the buffered data stream on the first channel of the bonded channel group specified in the first grant message.

* * * * *

UNITED STATES PATENT AND TRADEMARK OFFICE
CERTIFICATE OF CORRECTION

PATENT NO. : 10,075,282 B2
APPLICATION NO. : 15/049296
DATED : September 11, 2018
INVENTOR(S) : Charaf Hanna et al.

Page 1 of 1

It is certified that error appears in the above-identified patent and that said Letters Patent is hereby corrected as shown below:

In the Specification

At Column 2, Line number 45, please replace the term [T1] with -- Ti --.

At Column 3, Line number 28, please replace the term [T1] with -- Ti --.

At Column 6, Line number 61, please replace the term [T1] with -- Ti --.

Signed and Sealed this
Twentieth Day of November, 2018

Andrei Iancu
*Director of the United States Patent and Trademark Office*